United States Patent [19]

Mitsuda et al.

[11] 4,141,214
[45] Feb. 27, 1979

[54] EXHAUST GAS CLEANING APPARATUS OF AN INTERNAL COMBUSTION ENGINE

[75] Inventors: Tadao Mitsuda, Susono; Takeru Yasuda, Nagoya; Yoshiki Fukumori, Obu, all of Japan

[73] Assignee: Toyota Jidosha Kogyo Kabushiki Kaisha, Toyota, Japan

[21] Appl. No.: 823,758

[22] Filed: Aug. 11, 1977

[30] Foreign Application Priority Data

Jun. 28, 1977 [JP] Japan .................... 52-76174

[51] Int. Cl.² .................................................. F01N 3/10
[52] U.S. Cl. ........................................ 60/276; 60/290
[58] Field of Search .................................. 60/276, 290

[56] References Cited

U.S. PATENT DOCUMENTS

| | | | |
|---|---|---|---|
| 3,919,843 | 11/1975 | Arnaud | 60/290 |
| 3,931,710 | 1/1976 | Hartel | 60/290 |
| 3,962,867 | 6/1976 | Ikeura | 60/290 |

Primary Examiner—Douglas Hart
Attorney, Agent, or Firm—Stevens, Davis, Miller & Mosher

[57] ABSTRACT

Disclosed is an exhaust gas cleaning apparatus of an internal combustion engine, provided with a three-way catalytic converter, an air-fuel ratio sensor in the form of an oxygen concentration-cell which detects an air-fuel ratio higher than a stoichiometric air-fuel ratio at which the converter effectively operates, and a secondary air injection system adapted for increasing or decreasing the amount of secondary air introduced into the exhaust pipe of the engine in accordance with electrical signals transmitted from the air-fuel ratio sensor. Means are provided for controlling the speed of introduction of secondary air so that the speed of decreasing the amount of secondary air is higher than the speed of increasing the amount of secondary air. Therefore, the air-fuel ratio of the exhaust gas is effectively controlled by signals transmitted from the sensor to approximate the stoichiometric ratio.

2 Claims, 5 Drawing Figures

EXHAUST GAS CLEANING APPARATUS OF AN INTERNAL COMBUSTION ENGINE

FIELD OF THE INVENTION

The present invention relates to an exhaust gas recirculation apparatus for an internal combustion engine, which includes a three-way catalytic converter arranged in the exhaust system of the engine.

BACKGROUND OF THE INVENTION

Already known in the prior art is a three-way catalytic converter which can clean three major toxic components (HC, CO and $NO_x$) in the exhaust gas. The operation of the three-way catalytic converter is effectively attained when the exhaust gas is in a state wherein excess air as well as excess fuel is not left in the exhaust gas, i.e., the air-fuel ratio of the exhaust gas (the ratio of air remaining in the exhaust gas to fuel remaining in the exhaust gas) is maintained near the stoichiometric value.

For maintaining the air-fuel ratio near the stoichiometric value, an air injection system has been provided in the prior art for increasing or decreasing the amount of secondary air introduced into the exhaust manifold in accordance with electrical signals transmitted from an oxygen concentration-cell type air-fuel sensor, for example, an $O_2$ sensor which is arranged in an exhaust pipe of the engine.

However, this system has a disadvantage in that the air-fuel ratio cannot be effectively maintained near the stoichiometric value since the $O_2$ sensor cannot correctly detect the air-fuel ratio of the exhaust. Due to the fact that the air-fuel ratio is not maintained near the stoichiometric value, the three-way catalytic converter cannot operate effectively. As a result, a considerable amount of toxic components will remain in the gas exhausted from the engine into the atmosphere.

SUMMARY OF THE INVENTION

An object of the present invention is to provide an exhaust gas cleaning apparatus of an internal combustion engine, which apparatus is capable of effectively operating a three-way catalytic converter for cleaning up the three major toxic components in the gas exhausted from the engine.

Another object of the present invention is to provide an exhaust gas cleaning apparatus, for controlling the air-fuel ratio of the exhaust gas directed to the three-way catalytic converter by using an oxygen concentration-cell type air-fuel sensor, so that the air-fuel ratio is kept near the stoichiometric value.

A still further object of the present invention is to provide an exhaust gas cleaning apparatus, capable of compensating the difference between a stoichiometric air-fuel ratio at which the three-way catalytic converter effectively operates and the air-fuel ratio detected by the oxygen concentration-cell type sensor.

In order to attain the above-mentioned objects according to the present invention, an exhaust gas cleaning apparatus for an internal combustion engine is provided, which apparatus comprises:

a three-way catalytic converter arranged in the exhaust system of the engine, which converter effectively eliminates toxic components remaining in the exhaust gas when the air fuel ratio is maintained near a stoichiometric value;

air pump means driven by the crankshaft of the engine;

pipe means connected, on one end thereof, to the air pump means for receiving secondary air from the pump means and connected, on the other end thereof, to the exhaust system at a position located upstream of the catalytic converter for introducing secondary air into the exhaust system;

a flow control valve disposed in the pipe means for controlling an amount of secondary air directed toward the exhaust system via the pipe means, which valve has a diaphragm for forming air vacuum chamber on one side thereof, the opening of the flow control valve being controlled in accordance with the vacuum pressure level in the vacuum chamber;

a vacuum switching valve of the electromagnetic type having a common port, a first switching port and a second switching port, the valve being in its first position in which the common port communicates with the first port when the electromagnetic valve is energized, and the valve being in its second position in which the common port communicates with the second port when the elctromagnetic valve is de-energized;

pressure signal conduit means for connecting the common port with the vacuum chamber;

vacuum signal conduit means for connecting the first port with an engine port formed in the intake system;

atmospheric pressure signal conduit means for opening the second port to the atmosphere;

a sensor means in the form of an oxygen concentration-cell which is arranged in the exhaust system and which is used to detect a predetermined value of the air-fuel ratio which is higher than said stoichiometric air-fuel value;

a control unit for operating this electromagnetic valve in such a manner that the valve is in its first position when an electric signal, which indicates that the air fuel ratio is smaller than the predetermined value, is received by the unit, to cause a vacuum signal from the engine port to be transmitted into the vacuum chamber for moving the diaphragm in a first direction to increase the amount of secondary air passed through the flow control valve, and in such a manner that the valve is in its second position when another electric signal, which indicates that the air-fuel ratio is larger than the predetermined value, is received by the unit to cause an atmospheric air pressure signal to be transmitted into the vacuum chamber to move the diaphragm in a second direction opposite to the aforementioned first direction to decrease the amount of secondary air passed through the flow control valve;

a first means for controlling the rate of movement of the diaphragm in the first direction to increase the amount of secondary air; and a second means for controlling the speed of movement of the diaphragm in the second direction to decrease the amount of secondary air in such a manner that the speed in the second direction to decrease the amount of secondary air is higher than the speed in the first direction to increase the amount of secondary air. Accordingly, the difference between the stoichiometric air-fuel ratio value at which the three-way catalytic converter effectively operates and the predetermined air-fuel ratio value detected by the air fuel sensor is compensated by utilizing the present invention. As a result, the air-fuel ratio of the exhaust gas is maintained near the stoichiometric value by the sensor, thereby causing an effective cleaning of the above-mentioned three major toxic components.

DESCRIPTION OF A PREFERRED EMBODIMENT

Figure 1:
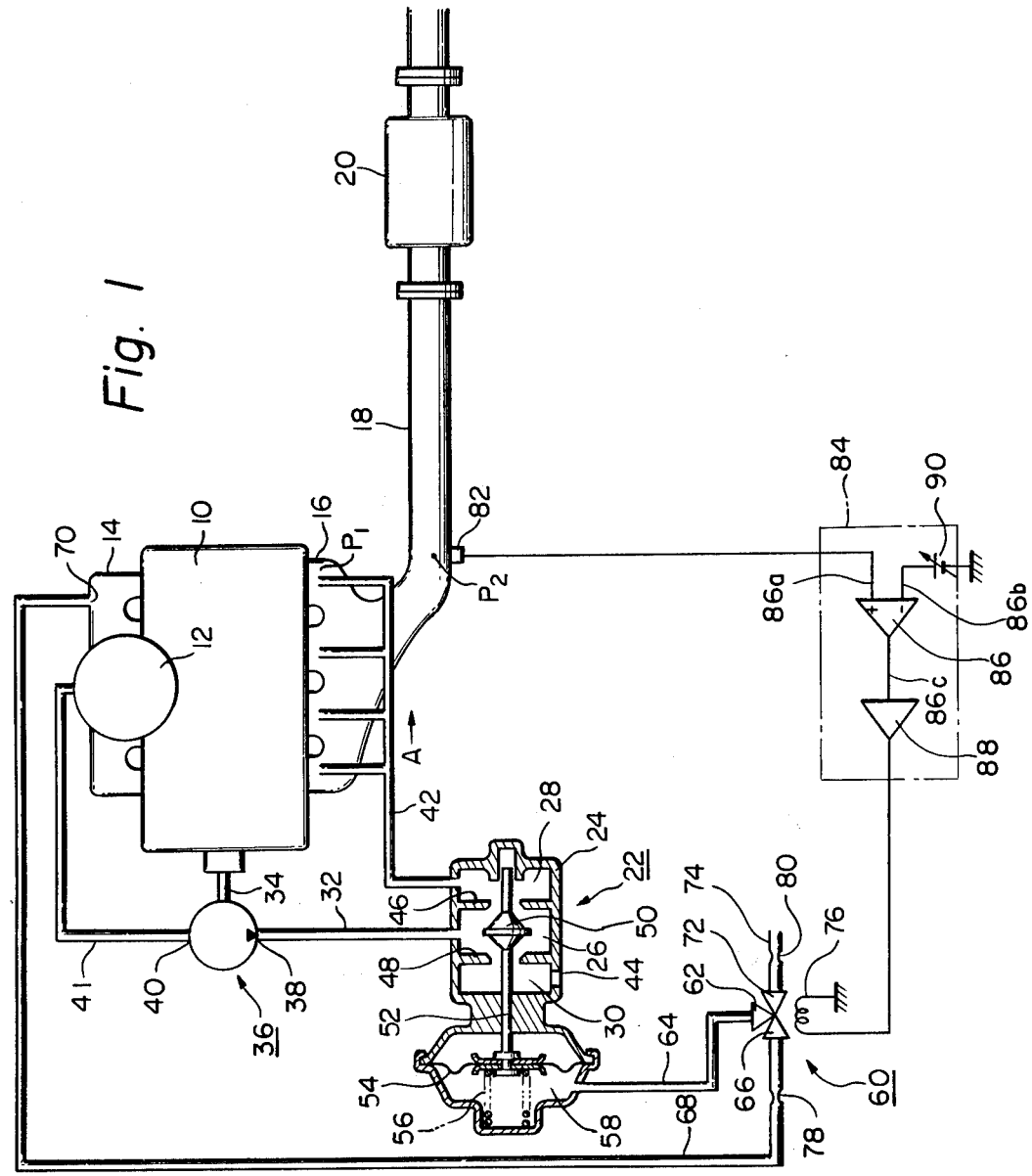
FIG. 1 is a schematic view of an exhaust gas cleaning apparatus according to the present invention.

In FIG. 1, showing a construction of the present invention, numeral 10 designates an engine body of an internal combustion engine. Intake air is introduced into combustion chambers (not shown) in the engine body 10, via an air cleaner 12, a carburetor (not shown) and an intake manifold 14. A resultant exhaust gas produced by combustion in the combustion chamber is introduced into an exhaust manifold 16. Connected to the exhaust manifold 16 is an exhaust pipe 18 in which a three-way catalytic converter 20 is disposed.

Figure 2:
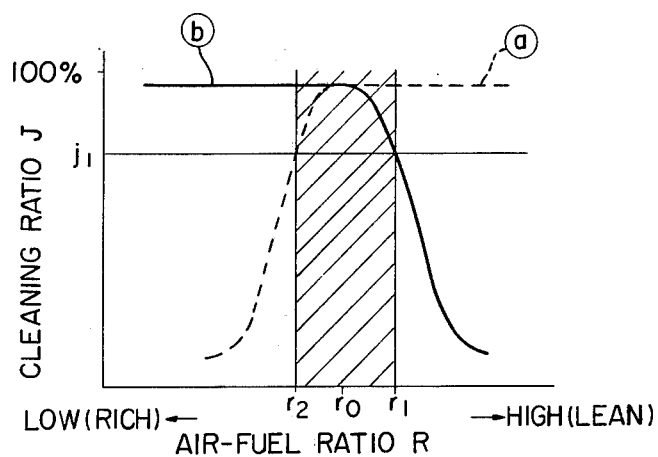
FIG. 2 is a graph indicating the cleaning ratios of the toxic components of the exhaust gas with respect to the air-fuel ratio.

In FIG. 2, the Y-coordinate indicates the cleaning ratio J (ratio of the amount of a toxic component in purified exhaust gas to the total amount of the exhaust gas) when the exhaust gas is passed through the three-way catalytic converter 20, and the abscissa indicates the air-fuel ratio R (ratio of amount of air remaining in the exhaust gas to the amount of fuel remaining in the exhaust gas). The stoichiometric value, at which there is no longer any excess air or excess fuel, is indicated by $r_0$. In FIG. 2, curve ⓐ schematically indicates the cleaning ratio of the CO or the HC component. Curve ⓑ schematically indicates the cleaning ratio of the $NO_x$ component. As is clear from curve ⓑ, in order to obtain an $NO_x$ cleaning ratio higher than the predetermined level $j_1$, it is necessary to maintain the air-fuel ratio R lower than the predetermined value $r_1$. As is clear from curve ⓐ, in order to obtain a CO or HC cleaning ratio higher than the predetermined level $j_1$, it is necessary to maintain the air-fuel ratio R higher than the predetermined value $r_2$. Therefore, in order to effectively decrease the three toxic components, it is necessary to maintain the air-fuel ratio R within a range of from $r_1$ to $r_2$, which range is represented by the shaded lines in FIG. 2.

In FIG. 1 a numeral 22 designates, diaphragm-operated flow control valve adapted for controlling an amount of secodary air introduced into the exhaust manifold 16, so that the air-fuel ratio R is kept near the stoichiometric ratio $r_0$ to effectively operate the three-way catalytic converter 20. The flow control valve 22 has a body 24 for forming three air chambers 26, 28 and 30. The common air chamber 26 is connected, via a secondary air pipe 32, to an outlet 38 of an air pump 36 driven by a crankshaft 34 of the engine 10. An inlet 40 of the air pump 36 is connected, via a secondary air pipe 41, to a purified space in the air cleaner 12. Therefore, secondary air from the air cleaner 12 is introduced into the common chamber 26 by the operation of the air pump 36 due to the rotation of the crankshaft 34 of the engine 10. The chamber 28 is connected to branch pipes of the exhaust manifold 16 by an air injection pipe 42 to introduce the secondary air into the exhaust manifold 16. The chamber 30 is opened to the atmosphere via a vent hole 44 to discharge an excess amount of air therefrom. A valve seat 46 is formed between the chambers 26 and 28, and another valve seat 48 is formed between the chambers 26 and 30. A valve body 50 is located between the valve seats 46 and 48 for controlling the amount of secondary air directed to the chamber 28 from the common chamber 26. The valve member 50 is mechanically connected, via a rod 52, to a diaphragm 54 which is urged by a spring 56 toward the body 24. A vacuum signal chamber 58 is formed on one side of the diaphragm 54. When the chamber 58 is under a vacuum pressure, the diaphragm 54 is moved away from the body 24 and moved against the force of the spring 56. Thereby the position of the valve member 50 with respect to the valve seat 46 is varied in accordance with the level of vacuum pressure at the chamber 58. Accordingly, the amount of secondary air directed to the air injection pipe 42 via the valve seat 46 is controlled in accordance with the pressure level in the chamber 58.

Numeral 60 designates a vacuum switching valve of the electromagnetic type adapted for controlling the vacuum level in the signal chamber 58 of the flow control valve 22. The electromagnetic valve 60 has a common port 62, and two switching ports 66 and 72. The common port 62 is connected to the signal chamber 58 via a vacuum signal conduit 64. The first switching port 66 is connected to a vacuum signal port 70 formed in the intake manifold 14, via a vacuum signal conduit 68. The second switching port 72 is opened to the atmosphere via an atmospheric air conduit 74. The electromagnetic valve 60 has a solenoid coil 76 for operating the valve 60. When the solenoid coil 76 is energized, the valve 60 is in its first position in which the common port 62 communicates with the first switching port 66. In this first position, a vacuum signal at the vacuum signal port 70 can be introduced into the signal chamber 58 of the flow control valve 22 (as will be described later), which signal introduction causes the valve member 50 to be moved away from the valve seat 46 for increasing the amount of secondary air directed to the air injection pipe 42. When the solenoid coil 76 is de-energized, the valve 60 is in its second position in which the common port 62 communicates with the second switching port 72. In this second position, atmospheric air from the conduit 74 is introduced into the signal chamber 58 of the flow control valve 22, thereby causing the valve member 50 to be moved toward the valve seat 46 for decreasing the amount of secondary air directed to the air injection pipe 42. Control orifices 78 and 80 are formed in the vacuum signal conduit 68 and in the atmospheric air conduit 74, respectively. These orifices 78 and 80 operate to control the speed of the movement of the valve member 50 of the flow control valve 22, as will be fully described later.

Figure 3:
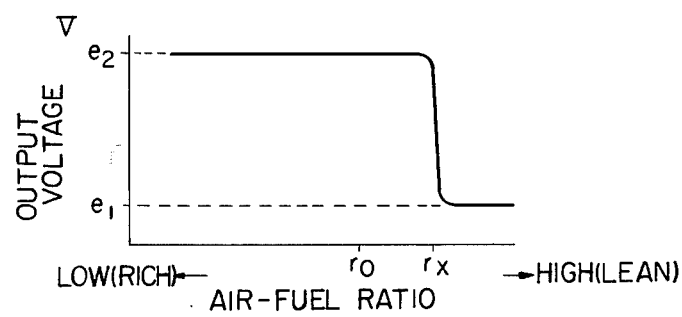
FIG. 3 is a curve indicating the output voltage of the $O_2$ sensor with respect to the air-fuel ratio.

An air-fuel ratio sensor 82 in the form of an oxygen concentration-cell, for example, an $O_2$ sensor, is arranged in the exhaust pipe 18. The $O_2$ sensor 82 operates to generate an electric signal in accordance with the difference between the concentrations of oxygen in the exhaust pipe 18 and in the atmosphere. When an excess amount of air remains in the exhaust pipe 18, in other words, when the air-fuel ratio of the exhaust gas is lean, the $O_2$ sensor 82 provides a low-level output signal $e_1$ as shown by FIG. 3, since the difference in the oxygen concentrations between the exhaust pipe 18 and the atmosphere is small. When excess fuel remains in the exhaust pipe 18, in other words, when the air-fuel ratio of the exhaust gas is rich, the $O_2$ sensor 82 can provide a high level output signal $e_2$ (FIG. 3) because the oxygen concentration difference is high. As is clear from the above, the $O_2$ sensor 82 provides two output signals $e_1$ and $e_2$ (FIG. 3) in accordance with the air-fuel ratio of the exhaust gas. A value of the air fuel ratio, at which the change of the output level from $e_1$ to $e_2$ or from $e_2$ to $e_1$ in FIG. 3 occurs, is $r_x$. Because such value is higher than the stoichiometric ratio $r_0$, it does not conform to the stoichiometric air-fuel ratio $r_0$ at which excess air and excess fuel are not left in the exhaust gas. The reason why the value $r_x$ is higher than the value $r_0$ is due to that the $O_2$ sensor 82 disposed in the exhaust pipe 18 cannot correctly detect the existence of oxygen in the exhaust gas, since the exhaust gas in the exhaust pipe 18 is not under an equivalent thermodynamic condition due to the low temperature of the exhaust gas in the pipe 18. According to the present invention, a means for compensating the values of the ratio $r_x$ which do not conform to the stoichiometric air fuel ratio $r_0$ is provided (as will be described later) in order to effectively operate the three-way catalytic converter 20.

Referring again to FIG. 1, numeral 84 is a control unit for operating the electromagnetic valve 60 in accordance with electric signals transmitted from the $O_2$ sensor 82. The control unit 84 comprises a comparator 86 including an input 86a connected to the $O_2$ sensor 82, another input 86b connected to a battery 90, an output 86c and an amplifier unit 88. The input level at the input 86b due to the battery B is adjusted so that it is located between the levels $e_1$ and $e_2$ (FIG. 3). As a result the comparator 86 provides an output signal at the output 86c when the signal of high level $e_2$ (FIG. 3) is received by the input 86a from the $O_2$ sensor 82 due to the fact that the air-fuel ratio of the exhaust gas is smaller than the value $r_x$ (FIG. 3). The output signal is supplied to the solenoid coil 76 of the electromagnetic value 60 via the amplifier unit 88 to energize the coil 76, for switching the electromagnetic valve 60 to its first position to establish communication between the common port 62 and the first switching port 66. Consequently, the vacuum signal is introduced into the signal chamber 58 of the flow control valve 22 from the vacuum port 70, via the conduit 68 provided with the orifice 78, the ports 66 and 62, and the conduit 64. Thus, the valve member 50 is moved away from the valve seat 46 in order to increase the amount of secondary air directed to the air injection pipe 42 as shown by an arrow A in FIG. 1. The comparator 86 does not provide any signal at the output 86c when the signal of the low level $e_1$ (FIG. 3) is received by the input 86a from the $O_2$ sensor 82 due to the fact that the air-fuel ratio is higher than the value $r_x$. Accordingly, the solenoid coil 76 of the electromagnetic valve 60 is not energized to place the valve 60 in its second position by which the common port 62 can communicate with the second switching port 72. As a result, atmospheric air is introduced into the signal chamber 58 of the flow control valve 22 via the conduit 74 which is provided with the orifice 80, the ports 72 and 62, and the conduit 58, for moving the valve member 50 toward the valve seat 46 in order to decrease the amount of secondary air directed to the air injection pipe 42 as shown by an arrow A in FIG. 1.

Figure 4:
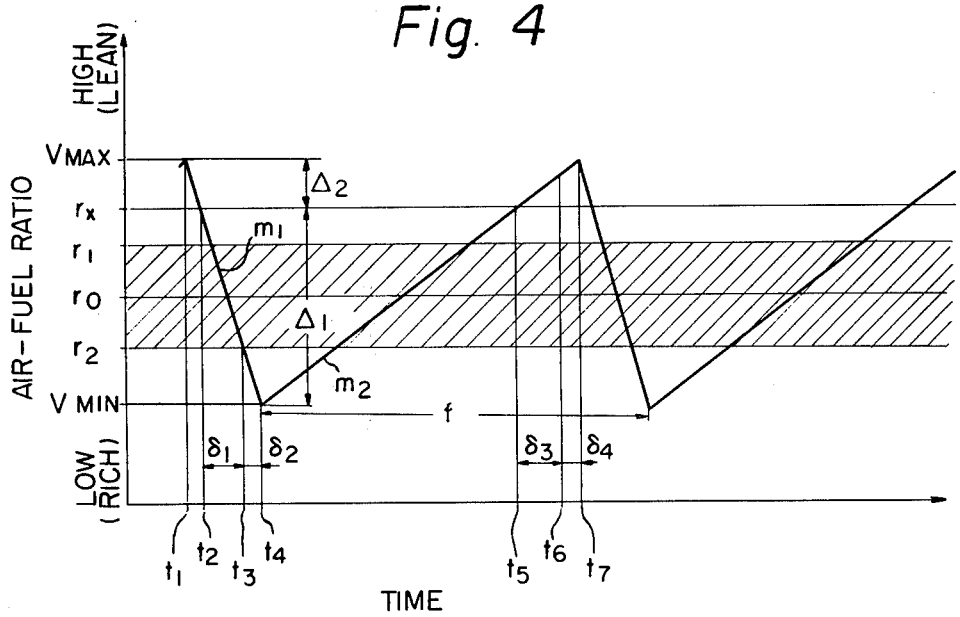
FIG. 4 is a graph showing changes of the air-fuel ratio of the exhaust gas in the exhaust system of the engine shown in FIG. 1.

In FIG. 4, the y-coordinate schematically indicates an air-fuel ratio of the exhaust gas at a location $P_1$ shown in FIG. 1 where secondary air is introduced into the exhaust manifold 16, and the abscissa indicates time. Due to the generation of the lean signal $e_1$ (FIG. 3) from the $O_2$ sensor 82 (FIG. 1), atmospheric air is introduced into the signal chamber 58 (FIG. 1) of the flow control valve 22 (FIG. 1) which in turn causes the valve member 50 (FIG. 1) to be moved toward the valve seat 46 (FIG. 1). The atmospheric air is introduced into the signal chamber 58 of the flow control valve to cause the valve member 50 to be moved toward the valve seat 46. Consequently, the amount of secondary air introduced into the exhaust manifold 16 (FIG. 1) at the location $P_1$ (FIG. 1) is decreased from the time $t_1$; and the air-fuel ratio of the exhaust gas at the location $P_1$ is also decreased as shown by the line ml in FIG. 4. The speed of decrease of the air-fuel ratio (in other words, the inclination of the line $m_1$) corresponds to the speed of the movement of the valve member 50 toward the valve seat 46, i.e., the rate of decrease in the vacuum pressure level in the signal chamber 58. This rate of decrease in the vacuum pressure level corresponds to the rate of introduction of atmospheric air into the chamber 58, i.e., the inner diameter of the second orifice 80.

As a result of the decreasing amount of secondary air as shown by the line ml in FIG. 4, the air fuel ratio of the location $P_1$ (FIG. 1) reaches the value $r_x$ at a time $t_2$ as shown in FIG. 4. However, since the $O_2$ sensor 82 is located downstream of the position $P_1$ (FIG. 1), the air-fuel ratio of the position $P_2$ of the exhaust pipe 18 (FIG. 1) near the $O_2$ sensor 82 is still higher than the value $r_x$ at the time $t_2$ (FIG. 4). The $O_2$ sensor 82 provides, at a time $t_3$, a rich signal $e_2$ (FIG. 3) indicating that the air-fuel ratio of the location $P_2$ has become lower than the value $r_x$.

In FIG. 4, $\delta_1$ which is equal to "$t_3-t_2$" is a delay time caused by the distance existing between the location $P_1$ where the secondary air is introduced and the location $P_2$ where the air fuel ratio is detected. The rich signal $e_2$ (FIG. 3) transmitted from the $O_2$ sensor 82 is received by the input 86a of the comparator 86 of the control unit 84, for causing the comparator 86 to provide an output signal at the output 86c. This output signal is amplified by the amplifier unit 88. As a result, the solenoid coil 76 is energized in order to cause the vacuum switching valve 60 to be switched to its first position by which the common port 62 can communicate with the first switching port 66. As a result of this, the vacuum signal port 70 in the intake manifold 14 is opened to the signal chamber 58 of the flow control valve 22 via the conduit 68, the ports 66 and 62, and the conduit 64. Therefore, the vacuum level in the chamber 58 is gradually increased due to the presence of the first orifice 78 in the conduit 68. Thus, the decrease of the air-fuel ratio at the location $P_1$ is stopped at a time $t_4$. In FIG. 4, $\delta_2$ (which is equal to "$t_4-t_3$") is a delay time produced by the control system which is comprised of the $O_2$ sensor 82, the control unit 84, the vacuum switching valve 60 and the flow control valve 22. At the time $t_4$, the air-fuel ratio is as low as r min.

In FIG. 4, $\Delta_1$ (which is equal to "$r_x-r$ min") is a maximum deviation (overshoot) of the air-fuel ratio from the value $r_x$ when the air-fuel ratio is decreased.

After the time $t_4$, the air-fuel ratio is increased, as shown by the line $m_2$ in FIG. 4, since the valve member 50 continues to move away from the valve seat 46 due to the introduction of a vacuum signal from the vacuum signal port 70 into the signal chamber 58 of the flow control valve 22. The rate of increase of the air-fuel ratio as shown by the line $m_2$ corresponds to the speed of movement of the valve member 50 away from the valve seat 46 (in other words, the rate of increase of the vacuum level in the chamber 58). The increase of the vacuum level corresponds to the inner diameter of the first orifice 78 formed in the conduit 68.

As a result of the increase of the amount of secondary air as shown by the line $m_2$, the air-fuel ratio of the location $P_1$ (FIG. 1) reaches the value $r_x$ at a time $t_5$ as shown in FIG. 4. However, since the $O_2$ sensor 82 is located downstream of the location $P_1$, the $O_2$ sensor continues to provide the rich signal $e_2$ (FIG. 3) for increasing the amount of secondary air. The $O_2$ sensor 82 provides, at a time $t_6$, a lean signal $e_1$ (FIG. 3) which indicates when the air-fuel ratio is higher than the value $r_x$.

In FIG. 4, $\delta_3$ (which is equal to "$t_6 - t_5$") is a delay time caused by the existence of a spacing between the location $P_2$ and the location $P_1$. The lean signal $e_1$ (FIG. 3) received by the comparator input 86a causes the solenoid coil 76 of the electromagnetic valve 60 to be de-energized. Consequently, the valve 60 is switched to its second position in which the common port 62 can communicate with the second switching port 72. Furthermore, as a result of this, the signal chamber 58 of the flow control valve 22 is opened to the conduit 74 via the conduit 64 and the ports 62 and 72. Accordingly, the atmospheric air is introduced from the conduit 74 to the vacuum signal chamber 58 of the flow control valve 22, so that the vacuum level in the chamber is gradually decreased due to the presence of the second orifice 80 in the conduit 74. The valve member 50 is thus moved toward the valve seat 46 to decrease the amount of secondary air directed to the air injection pipe 42 as shown by the arrow A in FIG. 1. Thereby the increase of the air-fuel ratio at the location $P_1$ (FIG. 1) is stopped at a time $t_7$.

In FIG. 4, $\delta_4$ (which is equal to "$t_7 - t_6$") is a delay time produced by the control system which is comprised of the $O_2$ sensor 82, the control unit 84, the vacuum switching valve 60 and the flow control valve 22. At the time $t_7$, the air-fuel ratio is as high as r max.

In FIG. 4, $\Delta_2$ (which is equal to "r max$-r_x$") is an overshoot of the air fuel ratio from the value $r_x$ when the air-fuel ratio is increased.

After the time $t_7$, the air-fuel ratio is decreased, since the valve member 50 continues to move toward the valve seat 46 due to the introduction of atmospheric air from the conduit 74 to the signal chamber 58 of the flow control valve 22. The rate of decrease of the air-fuel ratio corresponds to the inner diameter of the second orifice 80 as described above.

In the above-mentioned operation, the $O_2$ sensor 82 detects the air-fuel ratio $r_x$ which does not conform to and is larger than the stoichiometric ratio $r_0$, whereas the three major toxic components (CO, HC and $NO_x$) are effectively cleaned by the three-way catalytic converter 20 when the air-fuel ratio is near the stoichiometric value $r_0$, i.e., when the air-fuel ratio is maintained in a region located between the value $r_1$ and $r_2$ (this region is shown by shaded lines in FIG. 4). Therefore, in order to effectively operate the three-way catalytic converter 20, it is necessary to compensate the difference between the value $r_x$ and the value $r_0$.

According to the present invention, the first orifice 78, for controlling the speed of the increase of the vacuum level in the chamber 58, and the second orifice 80, for controlling the speed of the decrease of the vacuum level in the chamber 58, are utilized for compensating the difference between the values $r_x$ and $r_0$. The inner diameters of the first orifice 78 and the second orifice 80 are respectively determined so that the rate of the decrease in the amount of the secondary air is higher than the rate of increase in the amount of the secondary air. Consequently, the air-fuel ratio is rapidly decreased as shown by the line $m_1$ in FIG. 4, whereas the air-fuel ratio is slowly increased as shown by the line $m_2$ in FIG. 4. As a result, the maximum deviation of the air fuel ratio toward the rich side $\Delta_1$ will become larger than the maximum deviation of the air fuel ratio toward the lean side $\Delta_2$. Thus, the air fuel ratio, which changes as shown by the lines $m_1$ and $m_2$ of FIG. 4 in accordance with lapse of time, is effectively maintained near the stoichiometric ratio $r_0$, thereby causing an effective operation of the converter 20 for cleaning the three major toxic components in the exhaust gas.

According to the experiment, the best result for effecting a maximum exhaust gas cleaning operation is obtained when the speed of decrease of the air-fuel ratio (the inclination of the line $m_1$) is two or three times greater than the speed of the increase of the air-fuel ratio (the inclination of the line $m_2$) and when the frequency of the cycles of operation f (FIG. 4) is from 1 to 3 ($H_z$).

Figure 5:
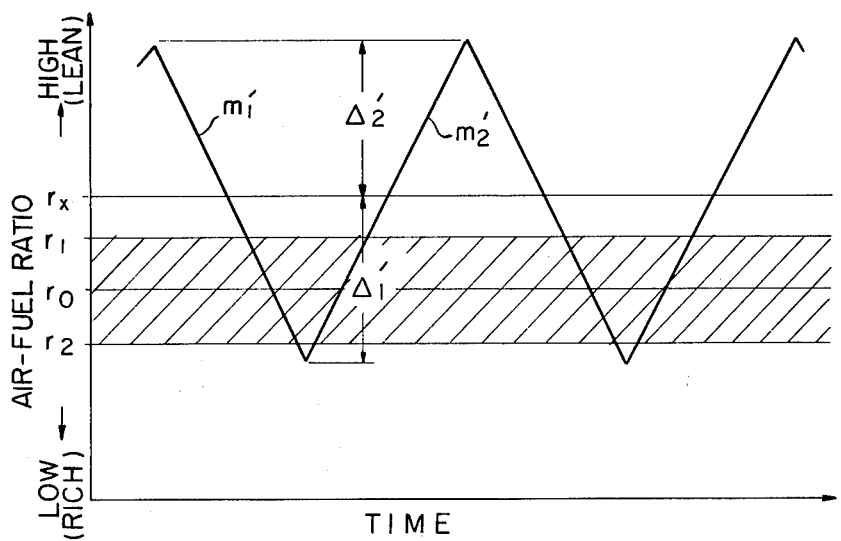
FIG. 5 is a graph showing changes in the air-fuel ratio of the exhaust gas in the exhaust system of a known engine.

In the known art, as shown by FIG. 5, the speed of the decrease of the air fuel ratio (line $m_1'$) is the same as the speed of the increase of the air fuel ratio (line $m_2'$). Therefore, the maximum deviation of the air-fuel ratio toward the rich side $\Delta_1'$ will become equal to the maximum deviation of the air-fuel ratio toward the lean side $\Delta_2'$. Thus, the air-fuel ratio (which is indicated by the lines $m_1'$ and $m_2'$) of the exhaust gas directed to the three-way catalytic converter 20 cannot be maintained near the stoichiometric ratio $r_0$, thereby causing inferior operation of the three-way catalytic converter 20.

What is claimed is:

1. An exhaust gas cleaning apparatus for an internal combustion engine, said apparatus comprising:
   a three-way catalytic converter arranged in the exhaust system of the engine, which converter effectively eliminates toxic components remaining in the exhaust gas when the air fuel ratio is kept near a stoichiometric value;
   air pump means driven by the crankshaft of the engine;
   pipe means connected, on one end thereof, to the air pump means for receiving secondary air from the pump means and connected, on the other end thereof, to the exhaust system at a position located upstream of the catalytic converter for introducing secondary air into the exhaust system;
   a flow control valve disposed in the pipe means for controlling an amount of the secondary air directed toward the exhaust system via the pipe means, which valve having a diaphragm for forming a vacuum chamber on one side thereof, and the opening of the flow control valve being controlled in accordance with the vacuum pressure level in the vacuum chamber;
   a vacuum switching valve of an electromagnetic type having a common port, a first switching port and a second switching port, the valve being capable of switched between a first position in which the common port communicates with the first port and a second position in which the common port communicates with the second port;

pressure signal conduit means for connecting the common port with the vacuum chamber;

first pressure signal conduit means for introducing a first pressure signal into the first port, which signal is one of an atmospheric pressure signal from the atmosphere and a vacuum pressure signal from the intake system of the engine;

second pressure signal conduit means for introducing a second pressure signal into the second port, which signal is the other of said atmospheric pressure signal and said vacuum pressure signal;

a sensor means in the form of an oxygen concentration-cell which is arranged in the exhaust system and which detects a predetermined value of air-fuel ratio which is higher than said stoichiometric air-fuel value;

a control unit for operating the electromagnetic valve in such a manner that electromagnetic the valve is in its first position when an electric signal, which indicates that the air fuel ratio is smaller than the predetermined value, is received by the unit to cause a first pressure signal to be transmitted into the vacuum chamber for moving the diaphragm in a first direction to increase the amount of secondary air passed through the flow control valve, and in such a manner that the electromagnetic valve is in its second position when another electric signal, which indicates that the air-fuel ratio is larger than said predetermined value, is received by the unit to cause a second pressure signal to be transmitted into the vacuum chamber to move the diaphragm in a second direction opposite to said first direction to decrease the amount of secondary air passed through the flow control valve;

a first means for controlling the rate of movement of the diaphragm in said first direction to increase the amount of secondary air, and;

a second means for controlling the rate of movement of the diaphragm in said second direction to decrease the amount of secondary air in such a manner that the rate of decreasing the amount of secondary air is higher than the rate of increasing the amount of secondary air, whereby the difference between the stoichiometric value and the predetermined value is compensated, which compensation causes the air-fuel ratio of the exhaust gas to be effectively kept near the stoichiometric value.

2. An exhaust gas cleaning apparatus according to claim 1, wherein said first means comprises an orifice formed in the first conduit means for controlling the speed of the transmission of a first pressure signal into the vacuum chamber, and wherein said second means comprises another orifice formed in the second conduit means for controlling the speed of the transmission of a second pressure signal into the vacuum chamber.

* * * * *